United States Patent [19]
Kuno et al.

[11] Patent Number: 5,677,811
[45] Date of Patent: Oct. 14, 1997

[54] MAGNETIC DISK DEVICE INCLUDING COMPUTER CHASSIS MOUNTING PROVISIONS FOR SUPPRESSING INTERNALLY AND EXTERNALLY GENERATED NOISE CURRENTS

[75] Inventors: Hiroyuki Kuno, Fujisawa; Tetsuya Hata, Tokyo, both of Japan

[73] Assignee: Kabushiki Kaisha Toshiba, Kawasaki, Japan

[21] Appl. No.: 529,717

[22] Filed: Sep. 18, 1995

[30] Foreign Application Priority Data

Jan. 31, 1995 [JP] Japan .................... 7-014641

[51] Int. Cl.⁶ ............................................. H05K 7/20
[52] U.S. Cl. ........................... 360/97.01; 361/685
[58] Field of Search .................... 360/97.01, 137, 360/97.02, 99.08; 361/685, 818, 212, 220, 753

[56] References Cited

U.S. PATENT DOCUMENTS

| | | | |
|---|---|---|---|
| 4,705,257 | 11/1987 | Leo et al. | 361/685 |
| 4,926,291 | 5/1990 | Sarraf | 361/685 |
| 5,332,306 | 7/1994 | Babb et al. | 361/685 |

*Primary Examiner*—Stuart S. Levy
*Assistant Examiner*—Kevin M. Watkins
*Attorney, Agent, or Firm*—Finnegan, Henderson, Farabow, Garrett & Dunner, L.L.P.

[57] ABSTRACT

Thread grooves (internal threads) for electrical connection are directly formed in two mounting portions among a total of eight mounting portions provided in the side surfaces and bottom surface of the base plate of a magnetic disk device which are provided in two positions electrically far from the magnetic head with respect to the noise frequency. The two mounting portions are grounded to the chassis of a system having the magnetic disk device mounted thereon. Mounting members having the electrical insulating property are fitted in the mounting holes of the six mounting portions which are disposed in positions electrically closer to the magnetic head and the mounting members are electrically isolated from the chassis of the system when they are mounted on the chassis of the system by use of fixing screws.

10 Claims, 6 Drawing Sheets

MAGNETIC DISK DEVICE INCLUDING COMPUTER CHASSIS MOUNTING PROVISIONS FOR SUPPRESSING INTERNALLY AND EXTERNALLY GENERATED NOISE CURRENTS

BACKGROUND OF THE INVENTION

1. Field of the Invention

This invention relates to a magnetic disk device mounted on a system casing of an information equipment such as a personal computer, and more particularly to a magnetic disk device in which measures are taken to prevent external noise generated from the system casing and internal noise generated in the magnetic disk device, and a mounting method of preventing the external noise and internal noise in the magnetic disk device.

2. Description of the Related Art

A magnetic disk device is widely used as an external storage device of an information equipment. Particularly, in recent years, small-sized magnetic disk devices using magnetic disks of 2.5 inches or less are widely used in small-sized personal computers such as lap-top type or notebook type personal computers or portable type information equipment in which data can be input by handwriting.

In the above information equipment (system), a portion which the user may directly touch is formed of resin material, for example, so as to be electrically isolated, but the internal chassis (system casing) is formed of metal by taking the shield measure such as disturbance wave shielding measure into consideration. Therefore, the casing of the magnetic disk device disposed in the system is formed of metal.

Generally, high-frequency noise currents resulting from the operations of various electronic circuits such as a display driver circuit of a display unit, for example, flow in the chassis in the system. Therefore, if the magnetic disk device is mounted directly on the chassis, the noise current will flow in the casing of the magnetic disk device via the chassis. Hereinafter, noise (noise current) flowing from the driving circuit of the like in the system into the magnetic disk device is referred to as external noise. Magnetic heads and the like for dealing with a minute signal are disposed in the magnetic disk device, and if external noise (noise current) flows into the magnetic disk device, a bad influence is given to the data recording/reproducing operation in some cases.

Therefore, in the conventional magnetic disk device, it is constructed to prevent the external noise from flowing into the device and completely isolate the casing of the magnetic disk device from the chassis of the system. That is, when the casing of the magnetic disk device is mounted on the chassis of the system, it is mounted with insulative materials disposed between all of the mounting portions of the casing and the chassis. With this structure, the magnetic disk device is mounted on the chassis while it is electrically isolated from the chassis.

Figure 1:
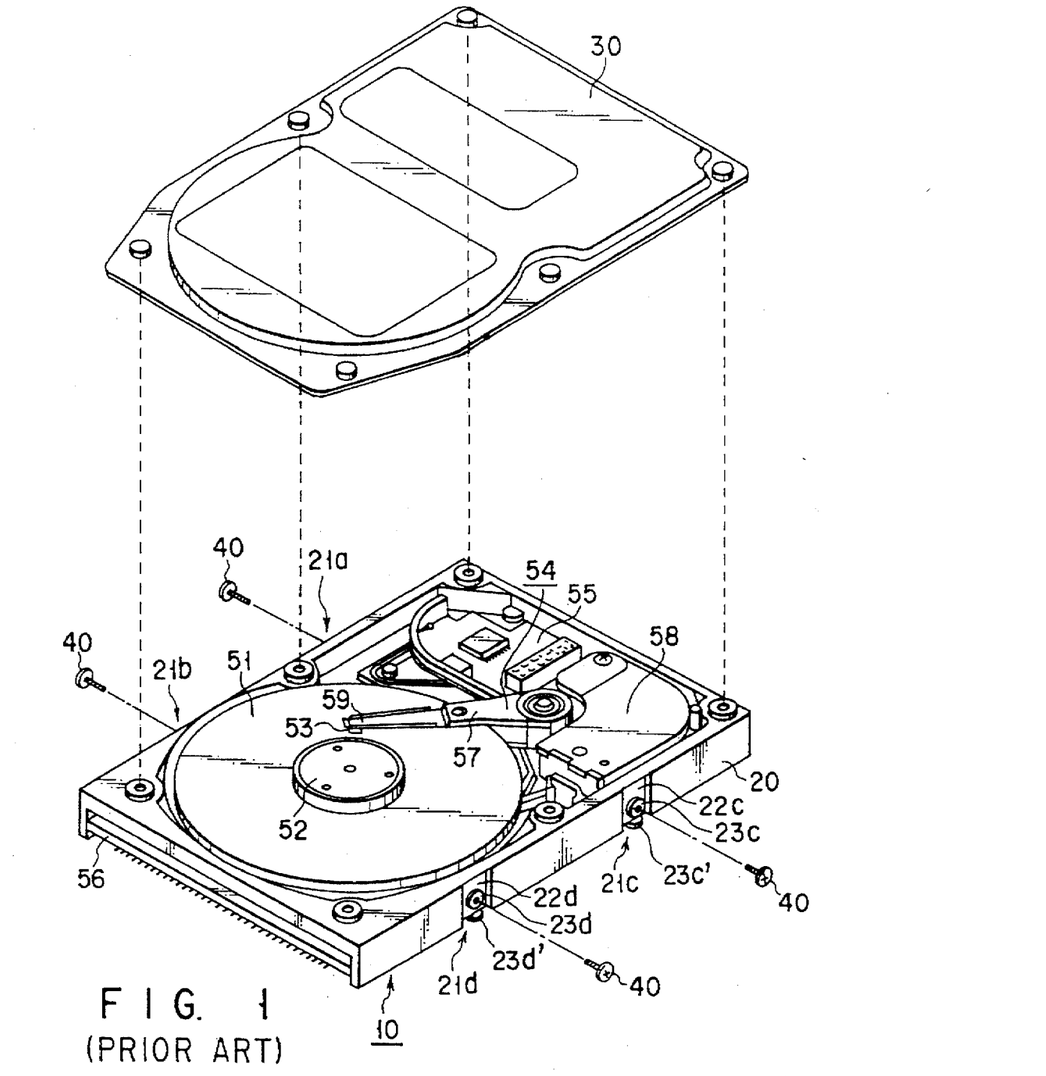
FIG. 1 is a perspective view showing the whole structure of the conventional magnetic disk device.
Figure 2A:
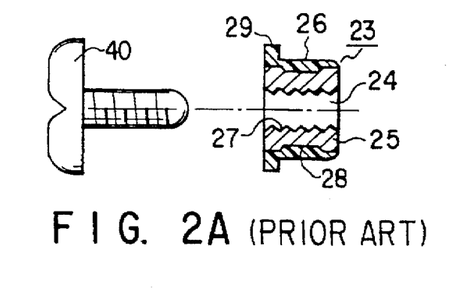
FIGS. 2A and 2B are cross sectional views showing the structure of an insulative mounting member disposed between the chassis and the casing mounting portion of the conventional magnetic disk device of FIG. 1.
Figure 2B:
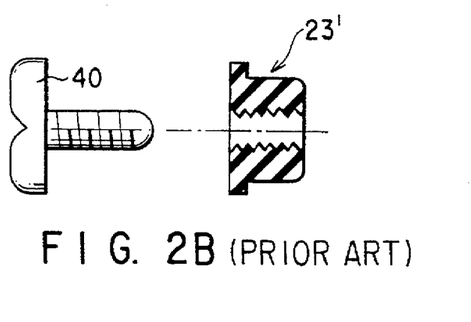

FIG. 1 is a perspective view showing the whole structure of the conventional magnetic disk device. FIGS. 2A and 2B are cross sectional views showing the structure of an insulative mounting member disposed between the chassis and each of the casing mounting portions of the magnetic disk device shown in FIG. 1.

A casing 10 of the magnetic disk device includes a base plate 20 on which a constituent part such as a magnetic disk which is a recording medium is mounted, and a cover 30 for covering the upper portion of the base plate 20. The base plate 20 and cover 30 are formed of metal by taking the disturbance wave preventing measure into consideration. Mounting portions 21 (21a to 21d) of the magnetic disk device for the chassis of the system are disposed in four positions on the right and left side surfaces of the base plate 20. The mounting portions 21 are constructed by concave portions 22 (22a to 22d) and mounting holes formed below the respective concave portions 22. Further, mounting portions which are the same as the mounting portions 21 are formed in four positions on the bottom surface of the base plate 20.

Mounting members 23 (23a to 23d) having the electrical insulating property are fitted in the mounting holes of the mounting portions 21 and fixed by an adhesive agent or something else. As shown in FIG. 2A, the mounting member 23 includes a cylindrical fixing portion 25 having a fixing hole 24 and an insulative portion 26 formed on the outer peripheral surface of the fixing portion 25. A thread groove 27 which engages with a screw 40 for fixation on the system chassis is formed in the fixing hole 24 of the fixing portion 25. The fixing portion 25 is formed of a metal material. On the other hand, the insulative portion 26 is formed of an insulative material such as plastic. The insulative portion 26 and fixing portion 25 are integrally formed by insert molding (forming by molding). In this case, a concave portion 28 is formed on the outer peripheral surface of the fixing portion 25 to enhance the degree of coupling with the insulative portion 26 at the time of insert molding. A flange portion 29 is formed on one end portion of the insulative portion 26. The flange portion 29 is exposed to face the surface of the base plate 20 of the casing 10 when the mounting member 23 is engaged into a corresponding one of the mounting holes of the mounting portions 21 and the presence of the flange 29 permits a small gap to be formed between the casings when the magnetic disk device is mounted on the system chassis.

Further, in the mounting portion on the bottom surface side of the base plate 20, insulative mounting members 23 having the same structure as the mounting member described above are used. As described above, each mounting member 23 fitted in the mounting holes of the mounting portions 21, is formed of an insulative material and a metal material. However, each mounting member may be formed of only an insulative material as shown in FIG. 2B.

On the other hand, on the base plate 20 of the casing 10, a disk rotating mechanism 52 for rotating a disk 51, a head driving mechanism 54 for moving a magnetic head 53, and a flexible printed circuit board 55 are disposed. The flexible printed circuit board 55 is connected to a printed circuit board 56 mounted on the rear surface of the base plate 20. A preamplifier for amplifying a readout signal from the magnetic head 53 and the like are mounted on the flexible printed circuit board 55. The disk rotating mechanism 56 has a spindle motor and the head driving mechanism 54 has an actuator 57 for supporting the magnetic head 53 and a voice coil motor 58 for driving the actuator 57. The magnetic head 53 is supported on the front end portion of the actuator 57 by means of a suspension 59 and moved upward when the disk 51 is rotated, and the magnetic head 53 is moved in the radius direction of the disk 51 by means of the actuator 57 and set on a target track to write/read data when the voice coil motor 58 is driven.

With the above structure, the conventional magnetic disk device is mounted on the system chassis with the insulative mounting members 23 in all of the mounting portions 21 which are provided in the four positions on the right and left side surfaces of the casing of the magnetic disk device and in the four positions on the bottom surface thereof. Therefore, introduction of the noise current from the system chassis side, that is, the external noise can be prevented, and a bad influence on the data recording/reproducing operation by the magnetic head 53 and others can be prevented.

However, if the magnetic disk device is mounted on the system chassis while the magnetic disk device is completely isolated from the system chassis, introduction of the noise current from the chassis side, that is, the external noise can be completely prevented, but the high-frequency electromagnetic wave generated from the printed circuit board 55 or the like in response to the data recording/reproducing operation, for example, in the casing 10 of the magnetic disk device is radiated to the exterior via the casing 10 as a medium. Therefore, there occurs a problem that the radiation amount of electromagnetic wave from the system itself having the magnetic disk device mounted thereon increases. Hereinafter, the noise current generated in the casing 10 of the magnetic disk device in response to the data recording/reproducing operation, for example, is referred to as internal noise.

Generally, the upper limit of the amount of noise radiated from a system such as a personal computer to the exterior is determined by various regulations. However, a phenomenon sometimes occurs that a potential difference is caused between the casing 10 of the magnetic disk device and the system chassis by generation of the internal noise and the radiation amount of electromagnetic wave (radiation noise) increases. Therefore, a bad influence may be given to another device arranged near the system.

SUMMARY OF THE INVENTION

An object of this invention is to provide a magnetic disk device which is to be mounted on a system casing and which can effectively prevent formation of the sneak path of noise from the system casing, that is, introduction of external noise and suppress radiation of electromagnetic wave from the magnetic disk device, that is, internal noise, and a method of mounting the magnetic disk device on the system casing for preventing noise.

According to a first aspect of this invention, there is provided a magnetic disk device which is to be mounted on a chassis of a host system, comprising a magnetic disk; a magnetic head for recording/reproducing data with respect to the magnetic disk; a driving mechanism for moving the magnetic head to a target position on the magnetic disk; a motor for rotating the magnetic disk; and a metal casing for containing the magnetic disk, magnetic head, driving mechanism and motor; wherein the casing includes a plurality of mounting portions to be mounted on the chassis, a conductive mounting member for mounting at least one of the plurality of mounting portions on the casing of the host system while electrically coupling them to each other, and an insulative mounting member for mounting at least one of the plurality of mounting portions on the chassis of the host system while electrically isolating them from each other.

According to a second aspect of this invention, there is provided a method of mounting a magnetic disk device which is to be connected to a chassis of a host system and which has a magnetic disk; a magnetic head for recording/reproducing data with respect to the magnetic disk; a driving mechanism for moving the magnetic head to a target position on the magnetic disk; a motor for rotating the magnetic disk; and a metal casing for containing the magnetic disk, magnetic head, driving mechanism and motor and having a plurality of mounting portions; comprising the steps of: a) mounting the casing on the chassis while electrically connecting at least one of the plurality of mounting portions to the casing; and b) mounting the casing on the chassis while electrically isolating at least one of the plurality of mounting portions from the chassis.

According to this invention, the mounting members having the electrical insulating property are fitted in the mounting holes of the six mounting portions which are contained in the total of eight mounting portions provided on the side surfaces and bottom surface of the base plate of the magnetic disk device and which are disposed at an electrically short distance with respect to the noise frequency from the magnetic head and are mounted on the chassis of the system by means of the fixing screws. Further, thread grooves (internal threads) for electrical connection are directly formed in the two mounting portions which are provided on one side surface and the bottom surface of the base plate in two positions at an electrically farthest distance with respect to the noise frequency from the magnetic head and are mounted on the chassis of the system by means of fixing screws. With the above structure, a noise current flowing from the chassis of the system to the base plate via the fixing screws, that is, external noise can be attenuated near the magnetic head. Therefore, the data recording/reproducing operation is not influenced by the external noise. Further, since the electromagnetic wave (internal noise) generated in the magnetic disk device is shielded by the casing and grounded to the chassis of the system from the mounting portions for electrical connection, the radiation amount of electromagnetic wave can be significantly suppressed as a system having the magnetic disk device mounted thereon.

Thus, according to this invention, formation of the sneak path of noise from the system casing can be effectively prevented and the radiation amount of electromagnetic wave from the magnetic disk device can be suppressed. In other words, the bad influence by the external and internal noises can be prevented.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention and, together with the general description given above and the detailed description of the preferred embodiment given below, serve to explain the principles of the invention.

FIGS. 7A and 7B are graphs showing the radiation state of electromagnetic wave (disturbance wave) generated in the magnetic device, that is, internal noise in the case of the conventional magnetic disk device shown in FIG. 1 and in the case of the magnetic disk device with the mounting structure shown in FIG. 3.

DETAILED DESCRIPTION OF THE PREFERRED EMBODIMENT

There will now be described an embodiment of this invention with reference to the accompanying drawings.

Figure 3:
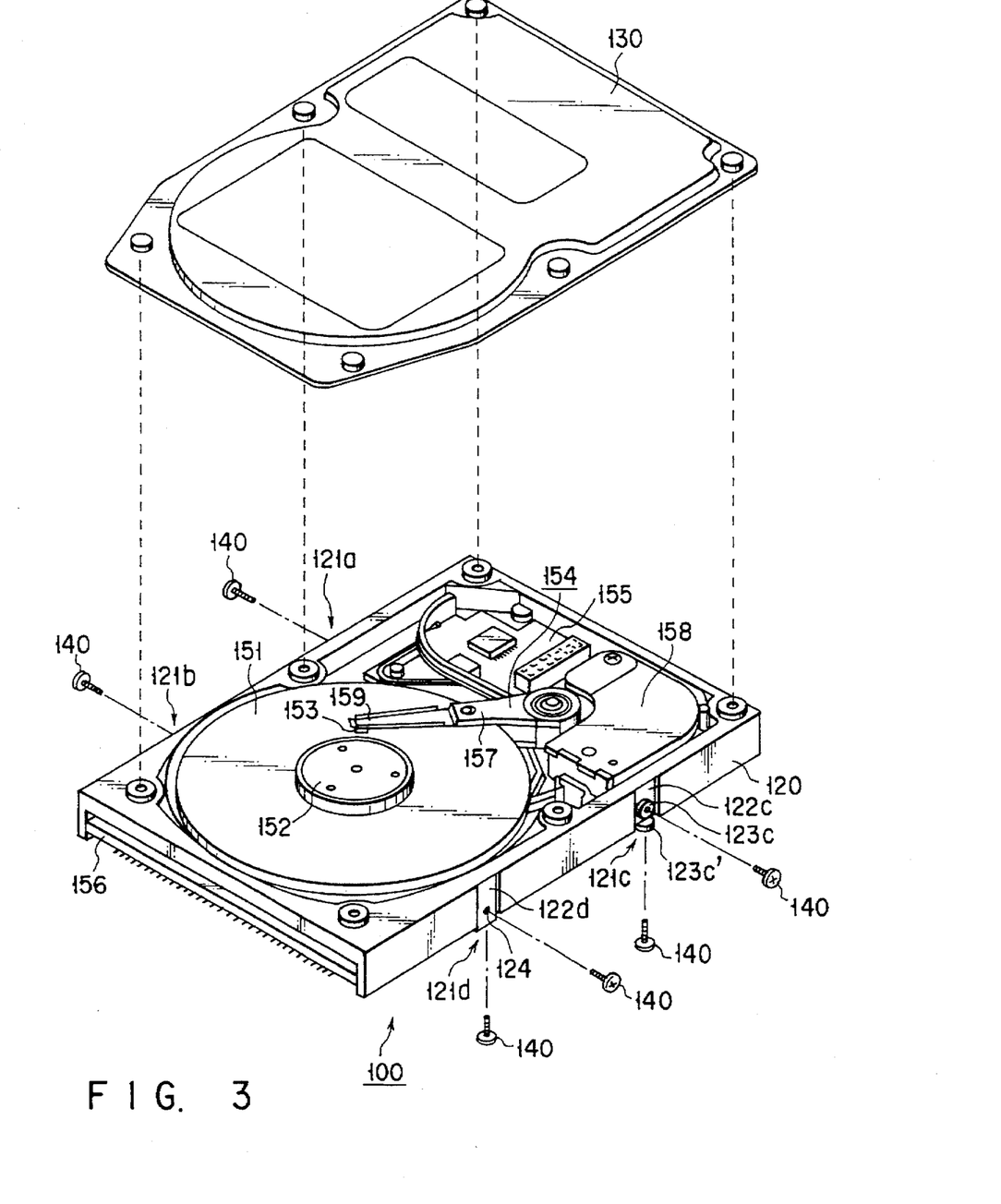
FIG. 3 is a perspective view showing the whole structure of a magnetic disk device according to an embodiment of this invention.
Figure 4:
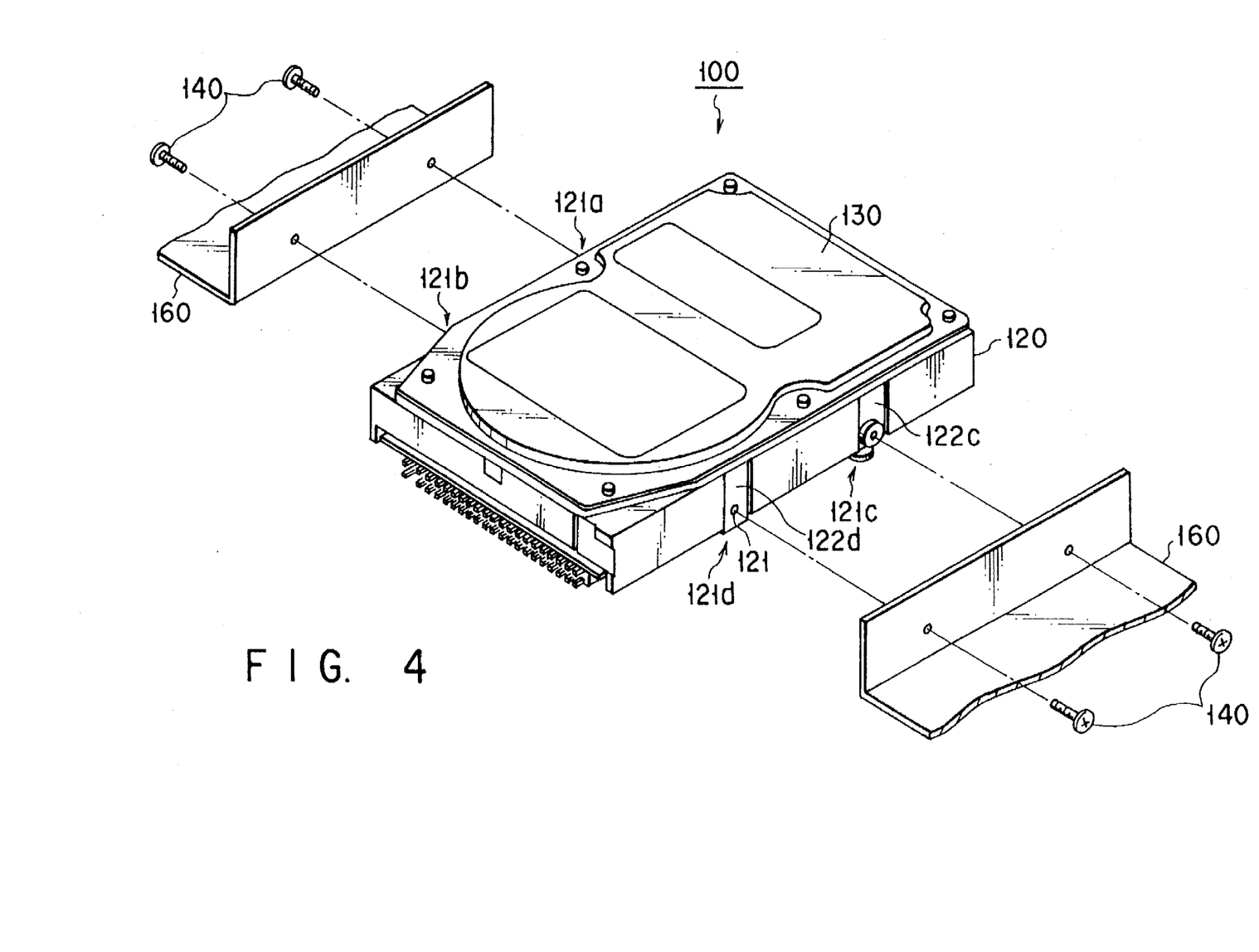
FIG. 4 is a view for illustrating one example of the state in which the magnetic disk device of FIG. 3 is mounted on the chassis of the system.
Figure 5:
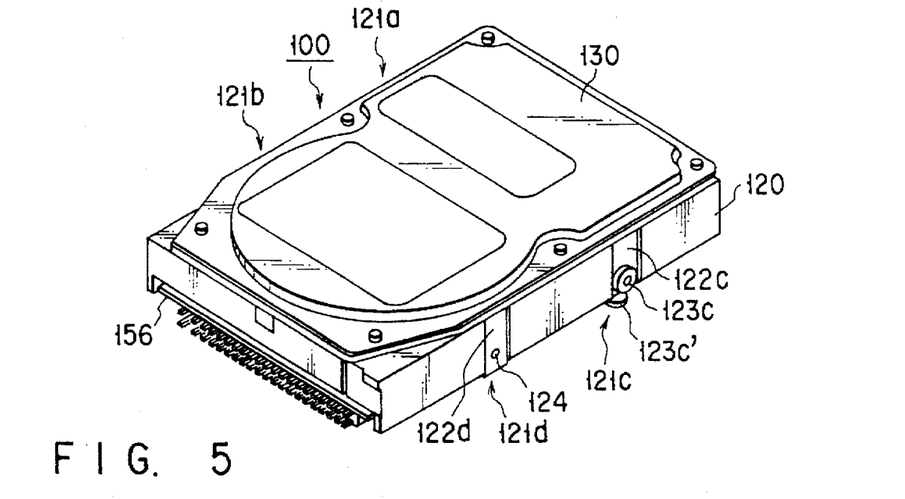
FIG. 5 is a perspective view showing the structure of the casing of the magnetic disk device of FIG. 3.
Figure 6:
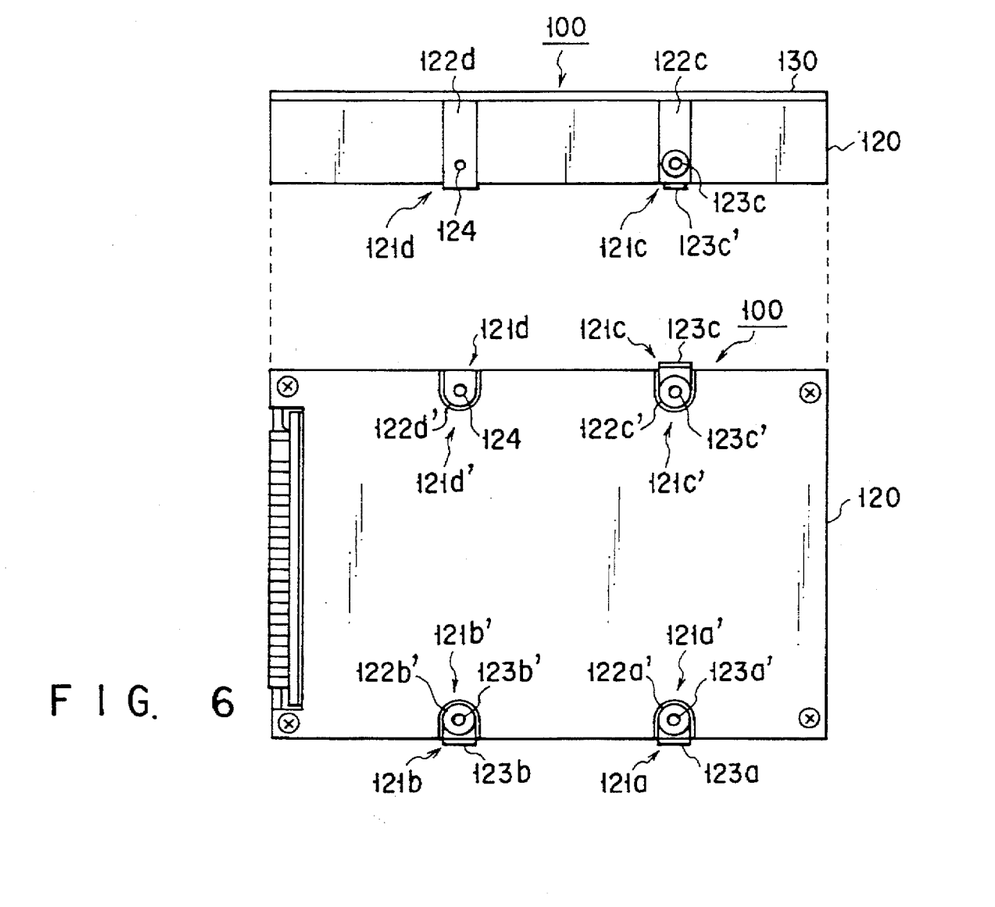
FIG. 6 is a side view and bottom view of the magnetic disk device of FIG. 3.

The whole structure of a magnetic disk device according to one embodiment of this invention is shown in FIG. 3. One example of the mounting state in a case where the magnetic disk device shown in FIG. 3 is mounted on the casing of a system such as a personal computer is shown in FIG. 4. Further, three views showing the structure of the casing in the magnetic disk device shown in FIG. 3 are shown in FIGS. 5 and 6. FIG. 5 is a perspective view, and FIG. 6 is a side view and bottom view.

A casing 100 of the magnetic disk device has a base plate 120 on which components of a magnetic disk device which is a recording medium are mounted, and a cover 130 for covering the upper portion of the base plate 120. The base plate 120 and cover 130 are formed by use of metal material by taking the disturbance electromagnetic wave preventing measure into consideration.

On the base plate 120 of the casing 100, a disk rotating mechanism 152 for rotating a disk 151, a head driving mechanism 154 for moving a magnetic head 153, and a flexible printed circuit board 155 are disposed. The flexible printed circuit board 155 is connected to a printed circuit board 156 mounted on the rear surface of the base plate 120. A preamplifier for amplifying a readout signal from the magnetic head 153 and the like are mounted on the flexible printed circuit board 155. The disk rotating mechanism 156 has a spindle motor and the head driving mechanism 154 has an actuator 157 for supporting the magnetic head 153 and a voice coil motor 158 for driving the actuator 157. The magnetic head 153 is supported on the front end portion of the actuator 157 by means of a suspension 159 and moved upward when the disk 151 is rotated, and the magnetic head 153 is moved in the radius direction of the disk 151 by means of the actuator 157 and set on a target track to write/read data when the voice coil motor 158 is driven.

Mounting portions 121 (121a to 121d) of the magnetic disk device for the chassis (system casing) of an information equipment are disposed in four positions on the right and left side surfaces of the base plate 120. The mounting portions 121 have concave portions 122 (122a to 122d) formed on the side surface of the base plate 120 and mounting holes formed below the respective concave portions 122. Further, mounting portions 121' (121a' to 121d') which are the same as the mounting portions 121 are formed in the four positions on the bottom surface of the base plate 20 corresponding to the mounting portions 121 on the right and left side surfaces of the base plate 120.

Thus, a total of eight mounting portions 121 are provided on the side surfaces and bottom surface of the base plate 120 of the magnetic disk device 100. When the above magnetic disk device 100 is mounted on the chassis of a system such as a personal computer, all of the eight mounting portions 121 are not necessarily used. Therefore, according to the shape of the chassis of the system having the magnetic disk device 100 mounted thereon, the magnetic disk device 100 shown in FIG. 3 may be mounted on a chassis 160 of the system by use of only the four mounting portions 121a to 121d provided on the side surfaces of the base plate 120 as shown in FIG. 4, for example.

However, in the magnetic disk device of this invention, mounting members 123 (refer to the mounting member 23 in FIG. 2A) having the electrical insulating property are fitted and fixed by use of an adhesive agent in the mounting holes of the six mounting portions 121 (121a to 121c, 121a' to 121c') other than the two mounting portions 121d, 121d' which are contained in the total of eight mounting portions 121 provided on the side surfaces and bottom surface of the base plate 120.

As shown in FIG. 2A, the mounting member 123 includes a cylindrical fixing portion 25 having a fixing hole 24 and an insulative portion 26 formed on the outer peripheral surface of the fixing portion 25. An insulative thread groove (internal thread portion) 27 which engages with a screw 140 (screw 40 in FIG. 2A) for fixation is formed in the fixing hole 24 of the fixing portion 25. The fixing portion 25 is formed of a metal material. On the other hand, the insulative portion 26 is formed of an insulative material such as plastic. The insulative portion 26 and fixing portion 25 are integrally formed by insert molding (forming by molding). In this case, a concave portion 28 is formed on the outer peripheral surface of the fixing portion 25 to enhance the degree of coupling with the insulative portion 26 at the time of insert molding. A flange portion 29 is formed on one end portion of the insulative portion 26. The flange portion 29 is exposed to face the surface of the base plate 120 of the casing 100 when the mounting member 123 is engaged into a corresponding one of the mounting holes of the six mounting portions 121 (121a to 121c, 121a' to 121c') and the presence of the flange 29 permits a small gap to be formed between the casings when the magnetic disk device is mounted on the system chassis. Note that, the mounting member 123 may be formed only of insulative material as shown in FIG. 2B.

Further, thread grooves (internal thread portions) 124 for electrical connection which are engaged with the fixing screws 140 are directly formed in the mounting holes of the two mounting portions 121d, 121d' which are provided in two positions on one side surface and the bottom surface of the base plate 120 and which are contained in the total of eight mounting portions 121 (121a to 121d, 121a' to 121d') formed on the side surfaces and bottom surface of the base plate 120. Thus, the grooves (internal thread portions) 124 for electrical connection are formed in the two mounting portions 121d, 121d' provided on the side surface and bottom surface of the base plate 120 and the two mounting portions are grounded to the chassis of the system via the fixing screws 140. Thus, those of the eight mounting portions 121 which are provided in positions at an electrically farther distance with respect to the noise frequency from the magnetic head 153 are selected as the two mounting portions grounded to the chassis of the system.

The electrically far position mainly indicates a position satisfying the following two conditions and the mounting portion to be grounded to the chassis of the system is selected according to the conditions. First, it is required that the mounting portion be set at a far distance from the magnetic head 153 of the magnetic disk device. This is because a case wherein external noise will flow in via the mounting portion 121a may be considered if the mounting portion 121a (121a') is grounded, for example. At this time, if the magnetic head 153 is positioned on the outer peripheral portion of the magnetic disk 151, an influence by the external noise becomes large and there occurs a possibility that a bad influence will be given to the recording/reproducing operation by the magnetic head 153. Next, the mounting portion 121 which is disposed at a short distance from the ground pin of the interface formed on the printed circuit board 156 is selected. The ground pin among the interface pins shown in FIG. 3 is disposed not on the mounting portion 121b side but on the mounting portion 121d side.

In order to satisfy the above conditions, the mounting portion 121d (121d') is determined to be grounded to the chassis of the system.

In the magnetic disk device with the above structure, since the mounting members 123 having the electrical insulating property are fitted in the mounting holes of those six mounting portions 121 (121a to 121c, 121a' to 121c') among the total of eight mounting portions 121 (121a to 121d, 121a' to 121d') provided on the side surfaces and bottom surface of the base plate 120 which are closer in position to the magnetic head 153 and mounted on the chassis of the system by use of the screws 140, the six mounting portions 121 (121a to 121c, 121a' to 121c') which are close in position to the magnetic head 153 are mounted on the system chassis while all of them are electrically isolated from the system chassis. Therefore, introduction of the noise current from the system chassis into the peripheral portion of the magnetic head 153 can be stably prevented and the magnetic head 153 can correctly effect the data writing/reading operation with respect to the magnetic disk 151.

On the other hand, the grooves (internal thread portions) 124 for electrical connection are formed directly in the two mounting portions 121d, 121d' which are formed on the side surface and bottom surface of the base plate 120 which are disposed in positions at an electrically farthest distance with respect to the noise frequency from the magnetic head 153 to satisfy the above condition and which are contained in the total of eight mounting portions 121 (121a to 121d, 121a' to 121d') provided on the side surfaces and bottom surface of the base plate 120 and mounted on the chassis of the system by use of the screws 140. Therefore, the high-frequency wave (electromagnetic wave), that is, internal noise generated at the time of data recording/reproducing in the magnetic disk device is grounded from the metal casing 100 to the system chassis via the conductive mounting portions 121d (121d'). As a result, the radiation amount of the electromagnetic wave from the magnetic disk device is significantly suppressed and the radiation amount of the electromagnetic wave from the whole system is also suppressed.

Figure 7A:
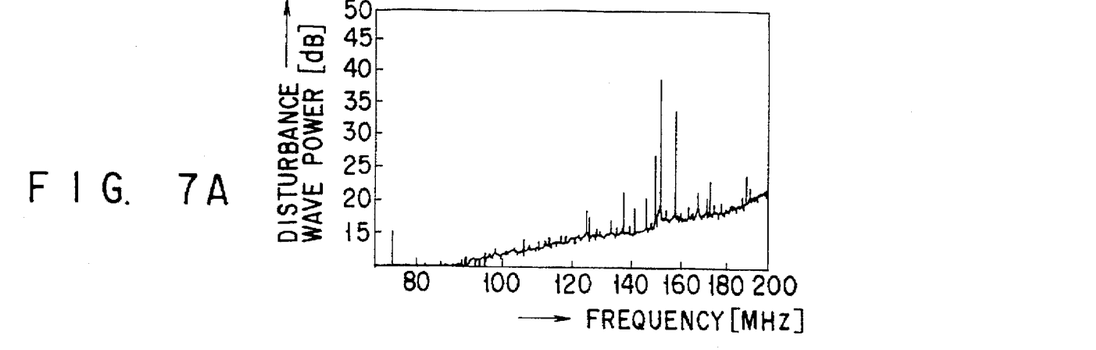
FIG. 7A is a graph showing the electromagnetic wave radiation state in the case of the conventional mounting structure in which the magnetic disk device is mounted on the system chassis while they are completely isolated from each other.
Figure 7B:
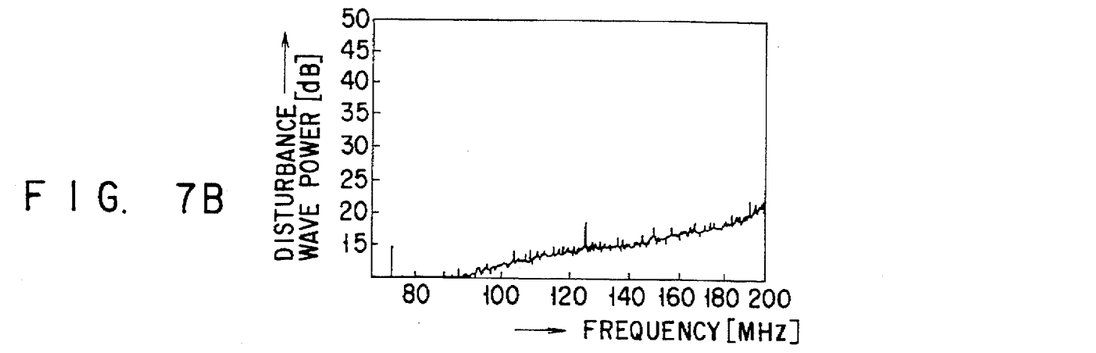
FIG. 7B is a graph showing the electromagnetic wave radiation state in the case of the mounting structure of this invention in which the magnetic disk device is mounted on the chassis while only the mounting portion which is farthest from the magnetic head is electrically connected.
Figure 8A:
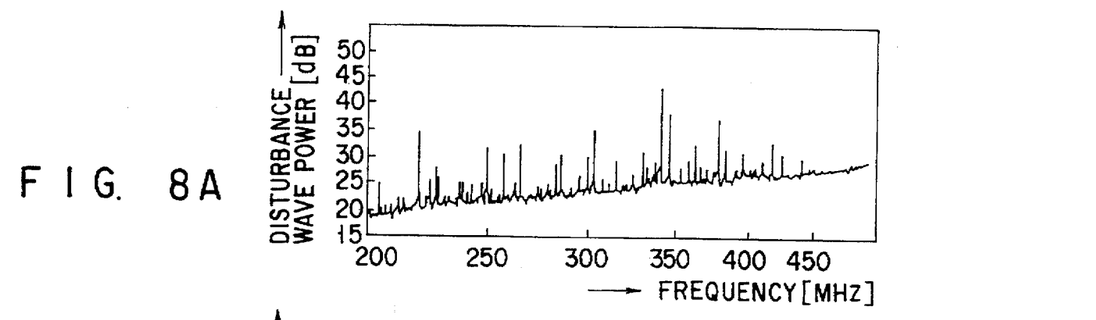
FIGS. 8A and 8B are graphs showing the radiation state of internal noise generated in the magnetic disk device when an antenna different from a detection antenna used in FIGS. 7A and 7B in the case of the conventional magnetic disk device shown in FIG. 1 and in the case of the magnetic disk device with the mounting structure shown in FIG. 3.
Figure 8B:
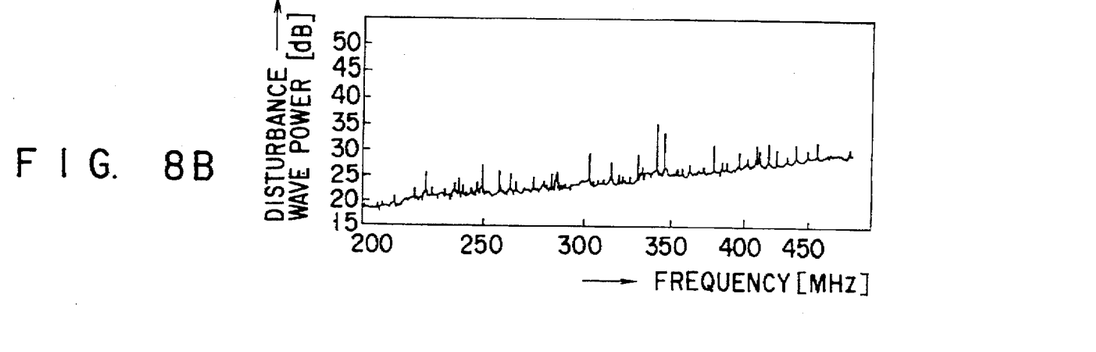

FIGS. 7A to 8B are diagrams showing the radiation states of the electromagnetic wave (disturbance wave) generated in the magnetic disk device with the conventional mounting structure in comparison with the magnetic disk device with the mounting structure of this invention, FIGS. 7A and 8A are diagrams showing the radiation states of the electromagnetic wave in the magnetic disk device which is mounted on and completely isolated from the system chassis by use of the conventional mounting structure, and FIGS. 7B and 8B are diagrams showing the radiation states of the electromagnetic wave in the magnetic disk device which is mounted on the system chassis by use of the mounting structure of this invention in which only the mounting portions 121d (121d') disposed in positions at an electrically far distance with respect to the noise frequency from the magnetic head 153 to satisfy the above-described conditions are electrically connected to the chassis. In FIGS. 7A and 7B and FIGS. 8A and 8B, the frequency ranges of the antennas of the devices for detecting the electromagnetic waves are different, and therefore, they are shown as different graphs.

As is clearly seen from FIGS. 7A to 8B, with the mounting structure of the conventional magnetic disk device, the output power of the electromagnetic wave (disturbance wave) is high in the entire range of the measured frequencies, but in the mounting structure of the magnetic disk device of this invention, the output power of the electromagnetic wave (disturbance wave) can be suppressed to a low level in the entire range of the measured frequencies.

Further, since signal grounds SG (signal earth lines) of the flexible printed circuit board 155 and printed circuit board 156 are electrically connected to the base plate 120, the external noise is directly grounded to the chassis of an information equipment via the conductive mounting portion 121d (121d') even if the external noise flows into the magnetic disk device via SG of the printed circuit board 156, for example.

Further, even if the noise current flows into from the system chassis via the conductive mounting portion 121d (121d'), a bad influence will not be given to the data recording/reproducing operation since the conductive mounting portion 121d (121d') is disposed in the farthest position from the magnetic head 153. The fact that the influence by the external noise is small even if the conductive mounting portion 121d (121d') is grounded to the system chassis is shown in the graph of FIG. 9.

Figure 9:
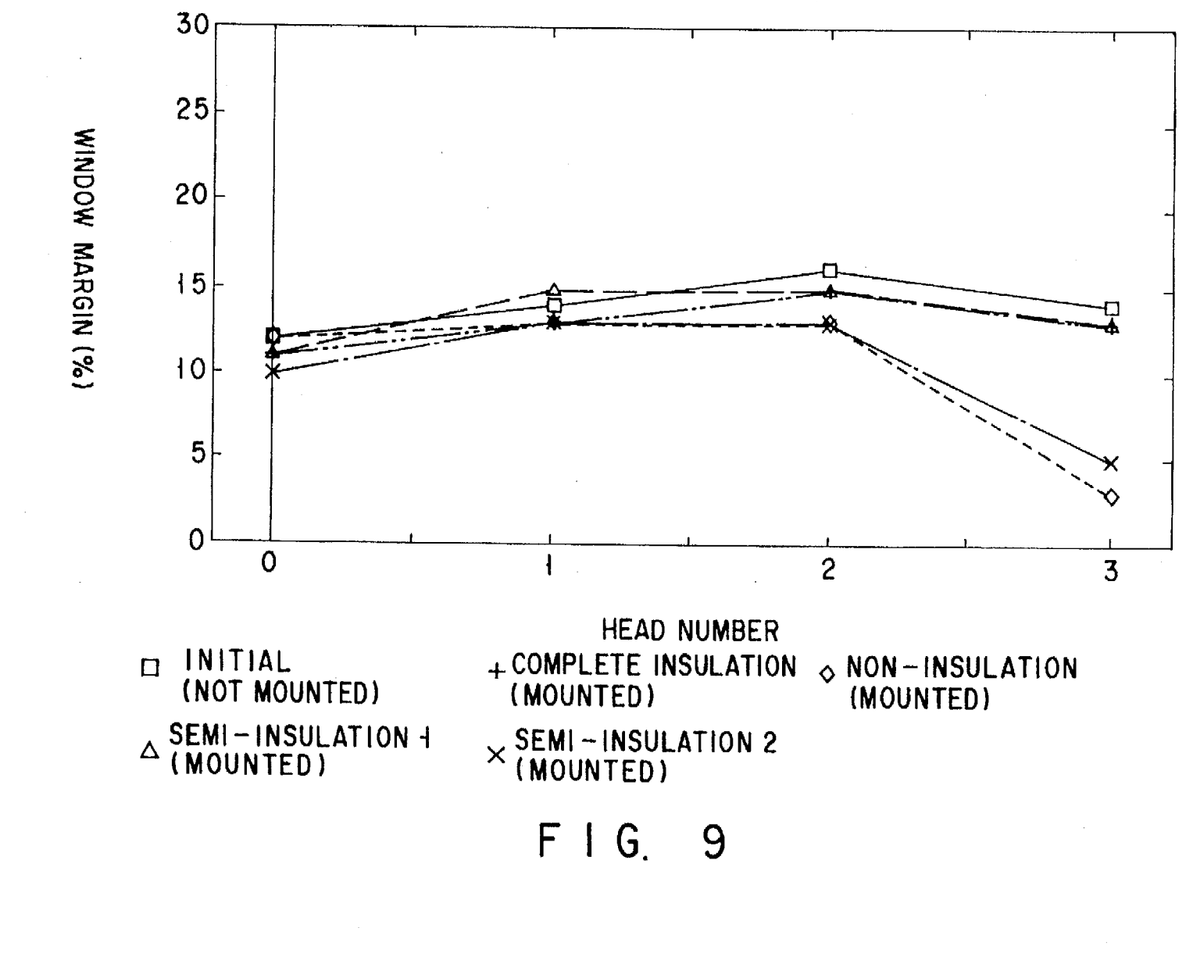
FIG. 9 is a graph for illustrating the influence by external noise flowing into the magnetic disk device from the system chassis for the magnetic disk device set in various states.

The graph of FIG. 9 shows window margins for the respective magnetic heads of the magnetic disk device having four magnetic heads 153. The head numbers 0 to 3 are sequentially attached in this order from the upper cover 130 of the magnetic disk device to the base of the casing 100. That is, the head 0 is set nearest to the upper cover 130 in the magnetic disk device and the head 3 is set nearest to the base. Further, the window margin indicates a period set for reading out data in the magnetic disk device and is generally influenced by the temperature, operation voltage and noise. If the window margin is deviated, a data readout error may occur. The graph of FIG. 9 indicates that the influence by the external noise becomes less as the window margin becomes larger (higher percentage).

A symbol □ indicates data in the initial state and the initial state is a state in which the magnetic disk device is not mounted on the chassis of the system. A symbol + indicates data in a state in which all of the mounting portions 121 are insulated from and mounted on the system. That is, data indicated by the symbol + indicates the influence by the external noise in the conventional magnetic disk device. A symbol ◇ indicates data in the magnetic disk device set in a state in which all of the mounting portions 121 are grounded to the chassis of the system. A symbol Δ indicates data in the magnetic disk device set in a state in which the mounting portions 121d (121d') are grounded to the chassis of the system as is explained in the embodiment of this invention. A symbol x indicates data in the magnetic disk device set in a state in which the mounting portions 121a (121a') are grounded to the chassis of the system.

As shown in FIG. 9, it is understood that substantially the same data as data (symbol +) obtained in the magnetic disk device in which all of the mounting portions 121 are set in the insulated state can be obtained in the magnetic disk device of this invention shown by the symbol Δ. That is, the influence by the external noise in the magnetic disk device can be suppressed by grounding only the mounting portions 121d (121d') which satisfy the above-described conditions. Further, data (symbol Δ) obtained in the magnetic disk device in which only the mounting portions 121d (121d') are grounded makes it possible to maintain the window margin higher in comparison with the case of data (symbol x) obtained in the magnetic disk device in which only the mounting portions 121a (121a') are grounded. That is, the influence by the external noise in the magnetic disk device can be more effectively suppressed by grounding the mounting portions 121d (121d') than by grounding the mounting portions 121a (121a'). In other words, like the case wherein all of the mounting portions are insulated, the influence by the external noise can be suppressed by grounding the mounting portions disposed in positions at an electrically far distance with respect to the noise frequency from the magnetic head to satisfy the above-mentioned conditions.

Therefore, according to the magnetic disk device of this invention and the method of mounting the magnetic disk device on the system casing, the mounting members 123 having the electrical insulating property are fitted in the mounting holes of those six mounting portions 121 (121a to 121c, 121a' to 121c') among the total of eight mounting portions 121 (121a to 121d, 121a' to 121d') provided on the side surfaces and bottom surface of the base plate 120 of the magnetic disk device which are close in position to the magnetic head 153 with respect to the noise frequency and mounted on the chassis of the system by use of the fixing screws 140. Further, the grooves (internal thread portions) 124 for electrical connection are formed directly in the two mounting portions 121d, 121d' which are formed on the side surface and bottom surface of the base plate 120 and which are disposed in positions at an electrically farthest distance with respect to the noise frequency from the magnetic head 153 and mounted on the chassis of the system by use of the fixing screws 140. Therefore, the noise current flowing in the system chassis, that is, internal noise can be prevented from giving a bad influence on the data recording/reproducing operation by the magnetic head 153. Further, since the electromagnetic wave (internal noise) generated in the magnetic disk device is shielded by the casing and grounded to the chassis of the system from the mounting portions 121d (121d') for electrical connection, the radiation amount of electromagnetic wave can be significantly suppressed as a system having the magnetic disk device mounted thereon.

Thus, according to this invention, formation of the sneak path of noise from the system casing can be effectively prevented and the radiation amount of electromagnetic wave from the magnetic disk device can be suppressed. In other words, the bad influence by the external and internal noises can be prevented.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A magnetic disk device which is to be mounted on a chassis of a host system, comprising:
   a magnetic disk;
   a magnetic head for recording/reproducing data with respect to said magnetic disk;
   a driving mechanism for moving said magnetic head to a target position on said magnetic disk;
   a motor for rotating said magnetic disk; and
   a metal casing for containing said magnetic disk, said magnetic head, said driving mechanism and said motors said metal, casing including a plurality of mounting members for mounting the magnetic disk device to the chassis of the host system, the magnetic disk device being mounted to the chassis of the host system only via the plurality of mounting members, said plurality of mounting members including
   at least one insulative member attached to said metal casing to electrically isolate said metal casing from the chassis, and
   at least one conductive portion disposed at a position electrically farther from said magnetic head than a position of all of said at least one insulative member from said magnetic head.

2. A magnetic disk device according to claim 1, wherein said at least one conductive portion has an internal thread portion.

3. A magnetic disk device according to claim 1, wherein said at least one insulative member has an internal thread portion that consists of metal, and an insulative material which is disposed so as to insulate the internal thread portion from said metal casing.

4. A magnetic disk device according to claim 1, wherein said at least one insulative member has an internal thread portion engaged by a screw.

5. A magnetic disk device which is to be mounted on a chassis of a host system, comprising:
   a magnetic disk;
   a magnetic head for recording/reproducing data with respect to said magnetic disk;
   a driving mechanism for moving said magnetic head to a target position on said magnetic disk;
   a motor for rotating said magnetic disk; and
   a metal casing for containing said magnetic disk, said magnetic head, said driving mechanism and said motor, said metal casing including a plurality of mounting members for mounting the magnetic disk device to the chassis of the host system, the magnetic disk device being mounted to the chassis of the host system only via the plurality of mounting members, said plurality of mounting members including
   at least one insulative member attached to said metal casing to electrically isolate said metal casing from the chassis, and
   a conductive portion disposed such that a distance between the conductive portion and said magnetic head is greater than a distance between all of said at least one insulative member and said magnetic head.

6. A magnetic disk device which is to be mounted on a chassis of a host system, comprising:

a magnetic disk;

a magnetic head for recording/reproducing data with respect to said magnetic disk;

a driving mechanism for moving said magnetic head to a target position on said magnetic disk;

a motor for rotating said magnetic disk;

an interface having a plurality of pins including a ground pin, for providing an interface with respect to the host system; and a metal casing for containing said magnetic disk, said magnetic head, said driving mechanism and said motor, said metal casing including a plurality of mounting members for mounting the magnetic disk device to the chassis of the host system, the magnetic disk device being mounted to the chassis of the host system only via the plurality of mounting members, said plurality of mounting members including at least one insulative member attached to said metal casing to electrically isolate said metal casing from the chassis, and a conductive portion disposed such that a distance between the conductive portion and said ground pin is shorter than a distance between all of said at least one insulative member and said ground pin.

7. A method of mounting a magnetic disk device which is to be connected to a chassis of a host system and which has a magnetic disk, a magnetic head for recording/reproducing data with respect to the magnetic disk, a driving mechanism for moving the magnetic head to a target position on the magnetic disk, a motor for rotating the magnetic disk, and a metal casing for containing the magnetic disk, the magnetic head, the driving mechanism and the motor, and having a plurality of mounting portions for mounting the magnetic disk device to the chassis of the host system the magnetic disk device being mounted to the chassis of the host system only via the plurality of mounting portions, said method comprising the steps of:

fixing at least one mounting portion of the plurality of mounting portions to the chassis of the host system so as to mount the metal casing on the magnetic disk device and to electrically isolate the metal casing from the chassis; and fixing at feast another one mounting portion of the plurality of mounting portions to the chassis of the host system so as to mount the metal casing on the magnetic disk device and to electrically connect the metal casing to the chassis, the at least another one mounting portion being electrically positioned farther from the magnetic head than all of the at least one mounting portion is positioned from the magnetic head.

8. A method of mounting a magnetic disk device which is to be connected to a chassis of a host system and which has a magnetic disk, a magnetic head for recording/reproducing data with respect to the magnetic disk, a driving mechanism for moving the magnetic head to a target position on the magnetic disk, a motor for rotating the magnetic: disk, and a metal casing for containing the magnetic disk, the magnetic head, the driving mechanism and the motor and having a plurality of mounting portions for mounting the magnetic disk device to the chassis of the host system, the magnetic disk device being mounted to the chassis of the host system only the plurality of mounting portions, said method comprising the steps of:

fixing at least one mounting portion of the plurality of mounting portions to the chassis of the host system so as to mount the magnetic disk device on the host system and to electrically isolate the metal casing from the chassis; and fixing another mounting portion of the plurality of mountings portions to the chassis of the host system so as to mount the magnetic disk device on the host system and to electrically connect the metal easing to the chassis, a distance between the another mounting portion and the magnetic head being farther than a distance between all of the at least one mounting portion and the magnetic head.

9. A method of mounting a magnetic disk device which is to be connected to a chassis of a host system and which has a magnetic disk, a magnetic head for recording/reproducing data with respect to the magnetic disk, a driving mechanism for moving the magnetic head to a target position on the magnetic disk, a motor for rotating the magnetic disk, an interface having a plurality of pins including a ground pin, for providing interface with respect to the host system, and a metal casing for containing the magnetic disk, the magnetic head, the driving mechanism and the motor and having a plurality of mounting portions for mounting the magnetic disk device to the chassis of the host system, the magnetic disk devise being mounted to the chassis of to host system only via the plurality of mounting portions, said method comprising the steps of:

fixing at least one mounting portion of the plurality of mounting portions to the chassis of the host system so as to mount the magnetic disk device on the host system chassis and to electrically isolate the metal casing from the chassis; and fixing another mounting portion of the plurality of mounting portions to the chassis of the host system so as to mount the magnetic disk device on the host system and to electrically connect the metal casing to the chassis, a distance between the another mounting portion and the ground pin being shorter than a distance between all of the at least one mounting portion and the ground pin.

10. A magnetic disk device which is to be mounted on a chassis of a host system, comprising:

a magnetic disk;

a magnetic head for recording/reproducing data with respect to said magnetic disk;

a driving mechanism for moving said magnetic head to a target position on said magnetic disk;

a motor for rotating said magnetic disk; and a metal casing for containing said magnetic disk, said magnetic head, said driving mechanism and said motor, said metal casing including a plurality of mounting members for mounting the magnetic disk device to the chassis of the host system, the magnetic disk device being mounted to the chassis of the host system only via the plurality of mounting members, said plurality of mounting members including at least one insulative member attached to said metal casing to electrically isolate said metal casing from the chassis, and at least one conductive portion disposed such that a position of all of said at least one insulative member is located nearest to said magnetic head and is one of a plurality of positions where the at least one insulative member and the at least one conductive portion are disposed.

* * * * *

UNITED STATES PATENT AND TRADEMARK OFFICE
CERTIFICATE OF CORRECTION

PATENT NO. : 5,677,811
DATED : October 14, 1997
INVENTOR(S) : Hiroyuki KUNO et al.

It is certified that error appears in the above-indentified patent and that said Letters Patent is hereby corrected as shown below:

Claim 1, column 10, line 18, "motors said metal," should read --motor, said metal--.

Claim 7, column 11, line 35, after "system", insert --,-- and line 44, "feast" should read --least--.

Claim 8, column 11, line 57, after "magnetic', delete ":"; and line 63, after "only", insert --via--;

Claim 8, column 12, lines 4 and 5, "mountings" should read --mounting--; and line 7, "easing" should read --casing--.

UNITED STATES PATENT AND TRADEMARK OFFICE
CERTIFICATE OF CORRECTION

PATENT NO. : 5,677,811
DATED : October 14, 1997
INVENTOR(S) : Hiroyuki KUNO et al.

It is certified that error appears in the above-indentified patent and that said Letters Patent is hereby corrected as shown below:

Claim 9, column 12, line 24, "devise" should read --device--; and "to host" should read --the host--.

Signed and Sealed this

Thirtieth Day of June, 1998

Attest:

BRUCE LEHMAN

Attesting Officer

Commissioner of Patents and Trademarks